US012811024B2

(12) United States Patent
Ollanik et al.

(10) Patent No.: US 12,811,024 B2
(45) Date of Patent: Nov. 24, 2026

(54) OPTICS-INTEGRATED CONFINEMENT APPARATUS INCLUDING POLARIZATION CONTROLLING OPTICAL ELEMENTS

(71) Applicant: Quantinuum LLC, Broomfield, CO (US)

(72) Inventors: Adam Jay Ollanik, Boulder, CO (US); Christopher T. Ertsgaard, Champlin, MN (US); Matthew J. Bohn, Broomfield, CO (US); Christopher Newman Gilbreth, Erie, CO (US)

(73) Assignee: Quantinuum LLC, Broomfield, CO (US)

( * ) Notice: Subject to any disclaimer, the term of this patent is extended or adjusted under 35 U.S.C. 154(b) by 334 days.

(21) Appl. No.: 18/734,552

(22) Filed: Jun. 5, 2024

(65) Prior Publication Data

US 2025/0014772 A1 Jan. 9, 2025

Related U.S. Application Data

(60) Provisional application No. 63/511,946, filed on Jul. 5, 2023.

(51) Int. Cl.

| | |
|---|---|
| ***G21K 1/20*** | (2026.01) |
| ***G06N 10/20*** | (2022.01) |
| ***G06N 10/40*** | (2022.01) |
| ***G21K 1/06*** | (2006.01) |
| ***G21K 1/16*** | (2006.01) |

(52) U.S. Cl.

CPC ............... *G21K 1/20* (2026.01); *G06N 10/20* (2022.01); *G06N 10/40* (2022.01); *G21K 1/067* (2013.01); *G21K 1/16* (2013.01); *G21K 2201/067* (2013.01)

(58) Field of Classification Search

CPC ............ G21K 1/20; G21K 1/067; G21K 1/16; G21K 2201/067; G06N 10/20; G06N 10/40

See application file for complete search history.

(56) References Cited

U.S. PATENT DOCUMENTS

| | | | |
|---|---|---|---|
| 11,037,776 | B1 | 6/2021 | Makotyn et al. |
| 12,014,917 | B2 | 6/2024 | Hayes et al. |
| 12,051,519 | B2 | 7/2024 | Ransford et al. |

(Continued)

OTHER PUBLICATIONS

Outgoing—ISA/210—International Search Report Mailed on Oct. 18, 2024 for WO Application No. PCT/US24/036186, 5 page(s).

(Continued)

*Primary Examiner* — Sean Luck

(74) *Attorney, Agent, or Firm* — Alston & Bird LLP

(57) ABSTRACT

An optics-integrated confinement apparatus is provided. The optics-integrated confinement apparatus includes a first substrate, a plurality of electrical components formed on the first substrate, and an on-chip beam delivery system. The plurality of electrical components define a confinement apparatus configured/operable to confine one or more quantum objects. The on-chip beam delivery system includes a waveguide, a coupler, and an optical element. The coupler is configured to couple an optical beam out of the waveguide and toward the optical element. The optical element is configured to modify a polarization of the optical beam and direct the optical beam toward a target location defined by the optics-integrated confinement apparatus.

23 Claims, 7 Drawing Sheets

(56) References Cited

U.S. PATENT DOCUMENTS

| | | | |
|---|---|---|---|
| 2020/0209656 A1 | 7/2020 | Young et al. | |
| 2021/0117845 A1 | 4/2021 | Choi et al. | |
| 2022/0149501 A1* | 5/2022 | Lee | G06N 10/00 |
| 2022/0327414 A1 | 10/2022 | Bohn et al. | |
| 2023/0057368 A1 | 2/2023 | Langer et al. | |

OTHER PUBLICATIONS

Outgoing Written Opinion of the ISA Mailed on Oct. 18, 2024 for WO Application No. PCT/US24/036186, 11 page (s).

Ropp, Chad, et al., "Integrating planar photonics for multi-beam generating and atomic clock packaging on chip", Light: Science & Applications, Apr. 3, 2023, 11 pages, vol. 12, No. 83, available on the Internet at https://www.nature.com/articles/s41377-023-01081-x.

Ropp, Chad, et al., "Meta-grating outcouplers for optimized beam shaping in the visible", Optics Express, May 10, 2021, pp. 14789-14798, vol. 29, No. 10, Optica Publishing Group, US.

U.S. Provisional Patent Application for "Optics-Integrated Confinement Apparatus System", unpublished (filed Oct. 3, 2022), Matthew Bohn (Inventor), Quantinuum LLC (Applicant), 63378124.

Yulaev, Alexander, et al., "Metasurface-Integrated Photonic Platform for Versatile Free-Space Beam Projection with Polarized Control", National Institute of Standards and Technology (NIST) Author Manuscript, 2019, ACS Photonics, available in PubMed Central on Oct. 7, 2020, 15 pages.

Bruzewicz, Colin D., et al., "Trapped-ion quantum computing: Progress and challenges," May 29, 2019, Applied Physics Reviews, vol. 6, No. 2, Id. 031314, 46 pages, AIP Publishing, US.

Niffenegger, R. J., et al., "Integrated multi-wavelength control of an ion qubit", Nature, Oct. 21, 2020 (online), 12 pages, vol. 586, Nature Portfolio, Germany.

* cited by examiner

OPTICS-INTEGRATED CONFINEMENT APPARATUS INCLUDING POLARIZATION CONTROLLING OPTICAL ELEMENTS

CROSS REFERENCE TO RELATED APPLICATIONS

This application claims priority to Provisional Application No. 63/511,946, filed Jul. 5, 2023, the content of which is incorporated herein by reference in its entirety.

TECHNICAL FIELD

Various embodiments relate to a confinement apparatus with integrated optics. An example embodiment relates to an optics-integrated confinement apparatus including a polarization controlling optical element.

BACKGROUND

When using an ion trap to perform quantum computing, gates and other functions of the quantum computer are performed by applying laser beams to ions contained within the ion trap. Delivering these laser beams to a large-scale quantum computer is a significant challenge due to the low ion height above the trap, the Rayleigh range of the laser beams, and the amount of laser power that needs to be delivered to an ion within the trap to perform the functions of the quantum computer. Through applied effort, ingenuity, and innovation many deficiencies of prior laser beam application techniques have been solved by developing solutions that are structured in accordance with the embodiments of the present invention, many examples of which are described in detail herein.

BRIEF SUMMARY OF EXAMPLE EMBODIMENTS

Example embodiments provide optics-integrated confinement apparatuses, systems including optics-integrated confinement apparatuses, controllers configured to control operation of various aspects of systems including optics-integrated confinement apparatuses, and/or the like. In various embodiments, an optics-integrated confinement apparatus comprises a plurality of electrical components formed on a substrate. The electrical components define a confinement apparatus configured to confine one or more quantum objects. For example, the electrical components are operable to generate a confining potential configured to confine one or more quantum objects. The optics-integrated confinement apparatus further includes one or more on-chip beam delivery systems configured to provide optical property-controlled optical beam and/or beams to one respective target locations defined by the optics-integrated confinement apparatus. For example, each of the one or more on-chip beam delivery systems includes a respective optical element configured to control polarization of optical beam provided by the respective optical element toward the target location.

According to an aspect of the present disclosure, an optics-integrated confinement apparatus is provided. In an example embodiment, the optics-integrated confinement apparatus includes a substrate; a plurality of electrical components formed on the substrate, and an on-chip beam delivery system. The plurality of electrical components define a confinement apparatus configured/operable to confine one or more quantum objects. The on-chip beam delivery system includes a waveguide, a coupler, and an optical element. The coupler is configured to couple an optical beam out of the waveguide and toward the optical element. The optical element is configured to modify a polarization of the optical beam and direct the optical beam toward a target location defined by the optics-integrated confinement apparatus.

In an example embodiment, the waveguide and the coupler are embedded within the substrate.

In an example embodiment, the coupler and the optical element define a beam path from the waveguide to the target location.

In an example embodiment, the beam path passes through a transparent conductive window disposed on a surface of the substrate.

In an example embodiment, the optical element is formed on or in the transparent conductive window.

In an example embodiment, a portion of the beam path between the transparent conductive window and the target location forms an altitude angle with the surface of the substrate that is greater than 0 degrees and up to 90 degrees.

In an example embodiment, the altitude angle is in a range of 30 to 80 degrees.

In an example embodiment, a portion of the beam path between the coupler and the optical element defines a coupler-to-element angle and the coupler-to-element angle is in a range of 30 to 80 degrees.

In an example embodiment, the optical element is embedded within the substrate.

In an example embodiment, the optical element is a wave plate.

In an example embodiment, the optical element is configured to modify the polarization of the optical beam by converting the polarization of the optical beam from linear polarization to elliptical polarization.

In an example embodiment, the optical element is configured to modify the polarization of the optical beam by rotating the polarization of the optical beam to a desired interaction angle.

In an example embodiment, the optical element is a transparent metasurface.

In an example embodiment, the coupler is a grating coupler.

In an example embodiment, the coupler comprises at least one of a sub-wavelength scale grating, a wavelength scale grating, or an array of sub-wavelength scale or wavelength scale features.

In an example embodiment, the optical element is configured to control one or more optical properties of the optical beam to cause a desired illumination pattern at the target location.

In an example embodiment, the optical element comprises sub-wavelength or wavelength scale features.

In an example embodiment, the optical element is configured to modify the polarization of the optical beam by introducing a phase delay based on the polarization of the optical beam when the optical beam is incident on the optical element.

In an example embodiment, the optical element is an active optical element such that the phase delay introduced to the optical beam by the optical element is controllable.

In an example embodiment, the optical beam is provided to the target location such that the optical beam is incident on at least one quantum object of the one or more quantum objects, the at least one quantum object being located at the target location, to cause a controlled evolution of a quantum state of the at least one quantum object.

In an example embodiment, the optics-integrated confinement apparatus further comprises a plurality of waveguides, a plurality of couplers, and a plurality of optical elements each configured to define a respective beam path to a respective target location defined by the optics-integrated confinement apparatus.

According to another aspect of the present disclosure, a system is provided. In an example embodiment, the system includes an optics-integrated confinement apparatus and a controller configured to control one or more voltage sources configured to provide voltage signals to respective electrical components of the plurality of electrical components to cause the confinement apparatus to generate a confining potential configured to confine the plurality of quantum objects. The optics-integrated confinement apparatus includes a substrate; a plurality of electrical components formed on the substrate, and an on-chip beam delivery system. The plurality of electrical components define a confinement apparatus configured/operable to confine one or more quantum objects. The on-chip beam delivery system includes a waveguide, a coupler, and an optical element. The coupler is configured to couple an optical beam out of the waveguide and toward the optical element. The optical element is configured to modify a polarization of the optical beam and direct the optical beam toward a target location defined by the optics-integrated confinement apparatus.

In an example embodiment, the system further includes a manipulation source and a pre-chip beam delivery system, wherein the manipulation source is configured to generate optical beam and the pre-chip beam delivery system is configured to provide the optical beam to the waveguide.

In an example embodiment, the controller is configured to control operation of the manipulation source.

In an example embodiment, the optical element is an active optical element and the controller is configured to control operation of the active optical element.

In an example embodiment, the system further incudes a feedback circuit and the controller is configured to control operation of the active optical element via the feedback circuit.

In an example embodiment, the system is a quantum charge-coupled device (QCCD)-based quantum computer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 2:
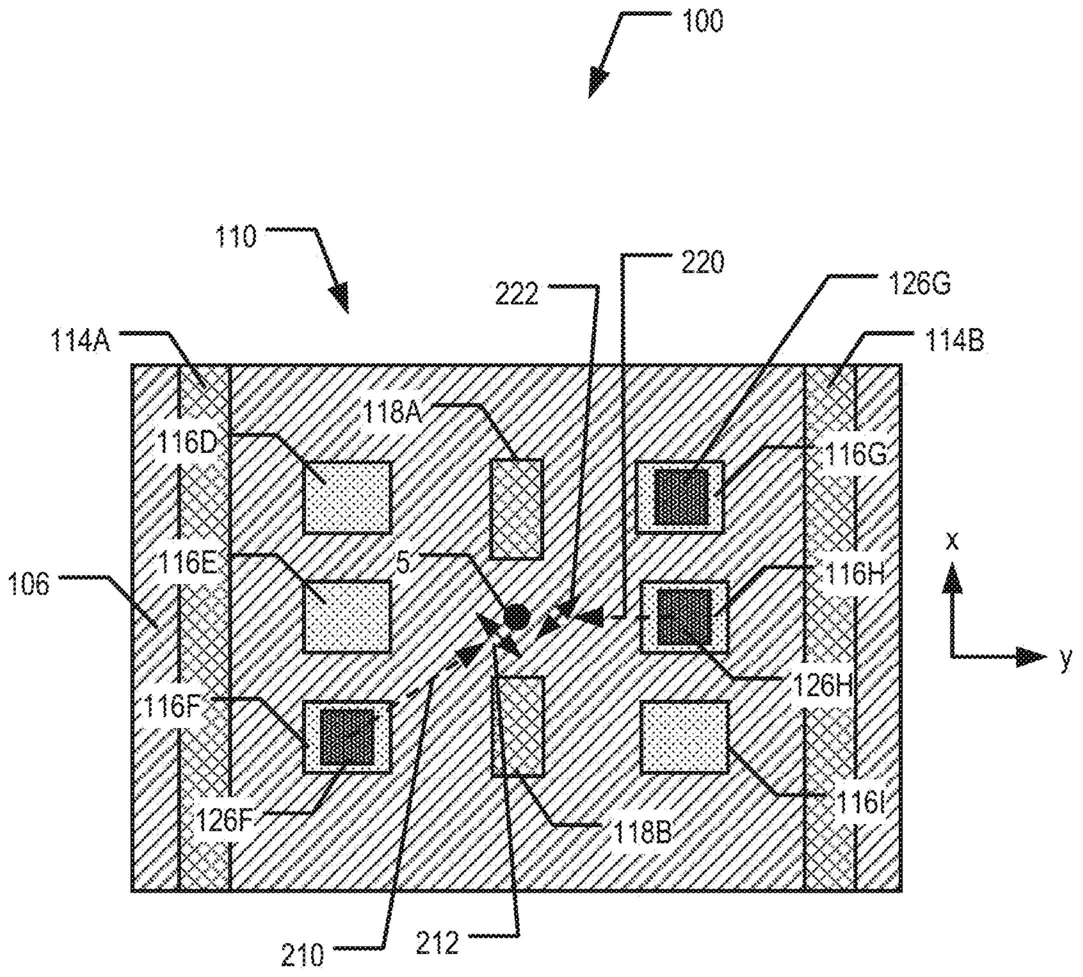

FIG. 2 provides a schematic diagram illustrating a top view of a portion of an example optics-integrated confinement apparatus, according to an example embodiment.

Figure 3:
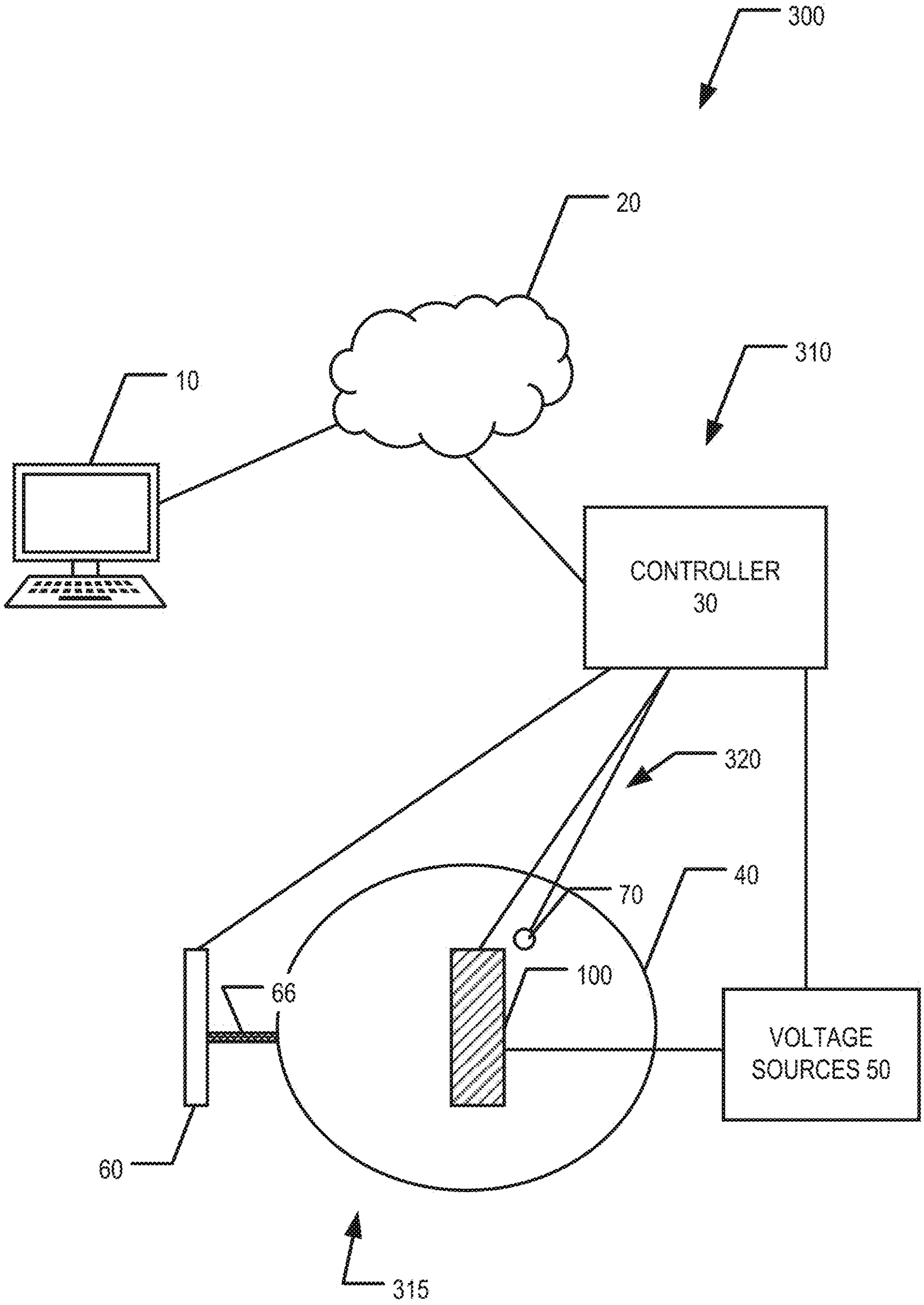

FIG. 3 is a schematic diagram illustrating an example quantum computing system comprising an optics-integrated confinement apparatus, according to an example embodiment.

Figure 4:
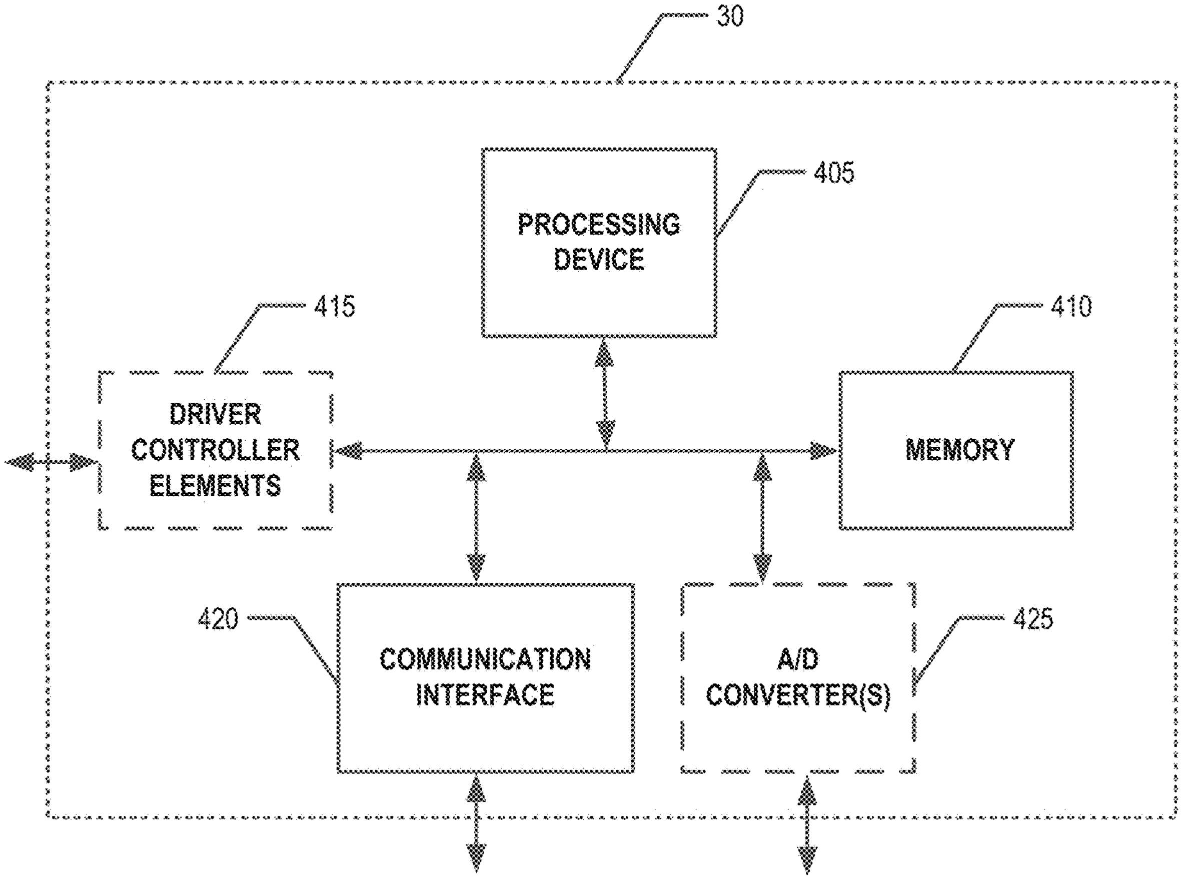

FIG. 4 provides a schematic diagram of an example controller of a quantum computer configured to control operation of various components of a quantum processor, according to various embodiments.

Figure 5:
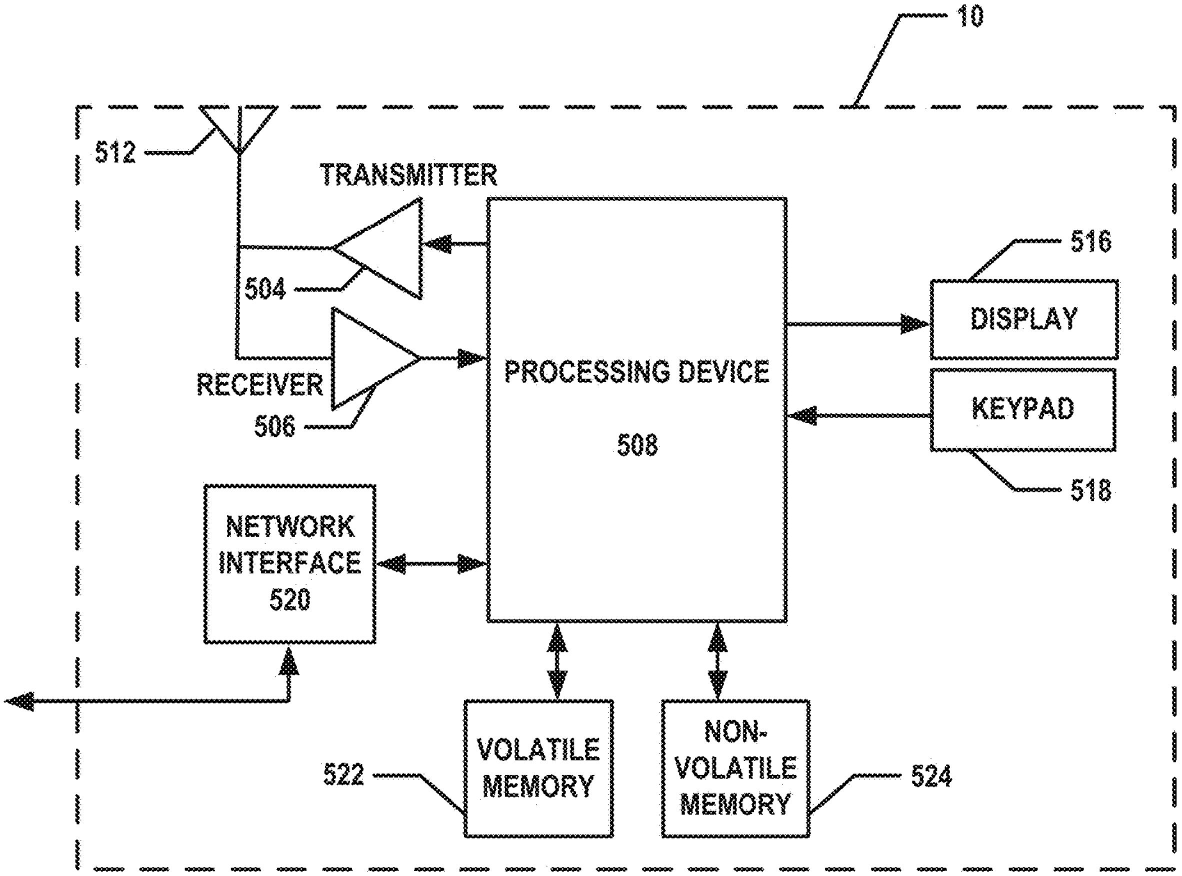

FIG. 5 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally," "substantially," and "approximately" refer to within engineering and/or manufacturing tolerances and/or within user measurement capabilities, unless otherwise indicated. Like numbers refer to like elements throughout.

Example embodiments provide optics-integrated confinement apparatuses, systems including optics-integrated confinement apparatuses, controllers configured to control operation of various aspects of systems including optics-integrated confinement apparatuses, and/or the like. In various embodiments, an optics-integrated confinement apparatus comprises a plurality of electrical components formed on a substrate. The electrical components define a confinement apparatus configured to confine one or more quantum objects. For example, the electrical components are operable to generate a confining potential configured to confine one or more quantum objects. The optics-integrated confinement apparatus further includes one or more on-chip beam delivery systems configured to provide optical property-controlled optical beam and/or beams to one respective target locations defined by the optics-integrated confinement apparatus. For example, each of the one or more on-chip beam delivery systems includes a respective optical element configured to control polarization of optical beam provided by the respective optical element toward the target location.

In various embodiments, an on-chip delivery system includes a waveguide, a coupler, and an optical element. The coupler is configured to couple optical beam out of the waveguide and toward the optical element. The optical element is configured to modify a polarization of the optical beam incident thereon and direct the optical beam toward a target location defined by the optics-integrated confinement apparatus.

In various embodiments, the confinement apparatus is an ion trap such as a surface ion trap, Paul ion trap, and/or the like. In various embodiments, the quantum object is an ion or an ion crystal (e.g., group or train of ions). In various embodiments, the quantum object is an atom (neutral or ionic), molecule (e.g., neutral, ionic, or multipolar), quantum dot, and/or other quantum object.

In various embodiments, the confinement apparatus may confine one or more quantum objects at the target location and the optical beam directed toward the target location by the optical element may be configured to cause a controlled evolution of respective quantum states of the one or more quantum objects located at the target location. For example, when the optics-integrated confinement apparatus is part of a quantum computer (e.g., a quantum charge-coupled device (QCCD)-based quantum computer) the optical beam directed toward the target location by the optical element is configured to interact with one or more quantum objects located at the target location (and possibly with another beam of optical beam directed to the target location by another on-chip delivery system) to cause performance of a single qubit gate, two-qubit gate, and/or the like on one or more quantum objects located at the target location.

In various embodiments, the interaction of a first optical beam with a second optical beam and/or with one or more quantum objects located at the target location is dependent on the polarization of the first optical beam and/or the polarization of the second optical beam. For example, to cause the desired interaction between the first optical beam, the second optical beam, and the one or more quantum objects, the polarization of the first optical beam, the polarization of the second optical beam, and/or the relative polarizations of the first optical beam and the second optical beam should be controlled.

Waveguides, such as single-mode waveguides, are capable of carrying optical beams having transverse electric (TE) or transverse magnetic (TM) polarization. However, a desired optical beam polarization may be polarization other than TE or TM polarization. For example, the desired polarization of an optical beam may be elliptical or circular polarization. In another example, the desired polarization of an optical beam may include an arbitrary angle between the direction of propagation of the optical beam and the polarization direction of the optical beam. Delivery of optical beams with elliptical or circular polarization or with an arbitrary angle between the direction of propagation of the optical beam and the polarization direction of the optical beam is technically difficult. Therefore, technical problems exist regarding how to provide optical beams to target locations of an confinement apparatus.

Various embodiments provide technical solutions to these technical problems. For example, various embodiments provide an optics-integrated confinement apparatus comprising a waveguide, a coupler, and an optical element. The waveguide may be provided with an optical beam having TE, TM, or other polarization able to efficiently propagate along the waveguide.

The coupler couples the optical beam (or at least a portion thereof) out of the waveguide and toward the optical element. The optical beam coupled out of the waveguide by the coupler is incident on the optical element. The optical element modifies the polarization, and possibly one or more other optical properties of the optical beam, and directs the optical beam toward the target location. Thus, any pre-chip beam delivery system and the on-chip delivery system is able to convey an optical beam having an efficiently conveyed polarization to near the target location. The optical element then modifies the polarization of the optical beam from the efficiently conveyed polarization to the desired polarization for the interaction at the target location. Thus, various embodiments provide improved beam delivery systems, optics-integrated confinement apparatuses, and system including optics-integrated confinement apparatuses.

Example Optics-Integrated Confinement Apparatus

Figure 1A:
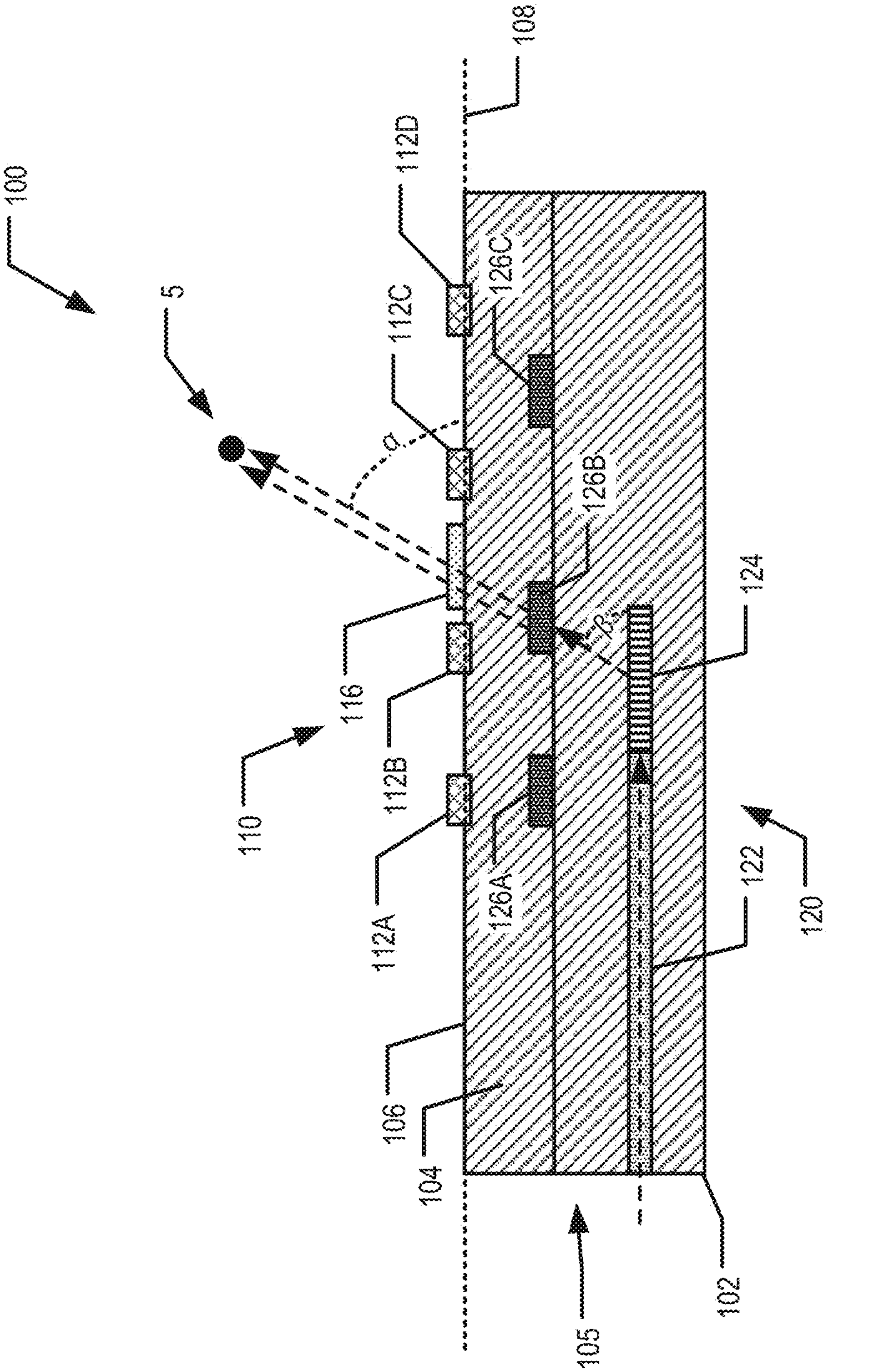
FIG. 1A is a schematic diagram illustrating a cross-sectional view of a portion of an example optics-integrated confinement apparatus, according to an example embodiment.
Figure 1B:
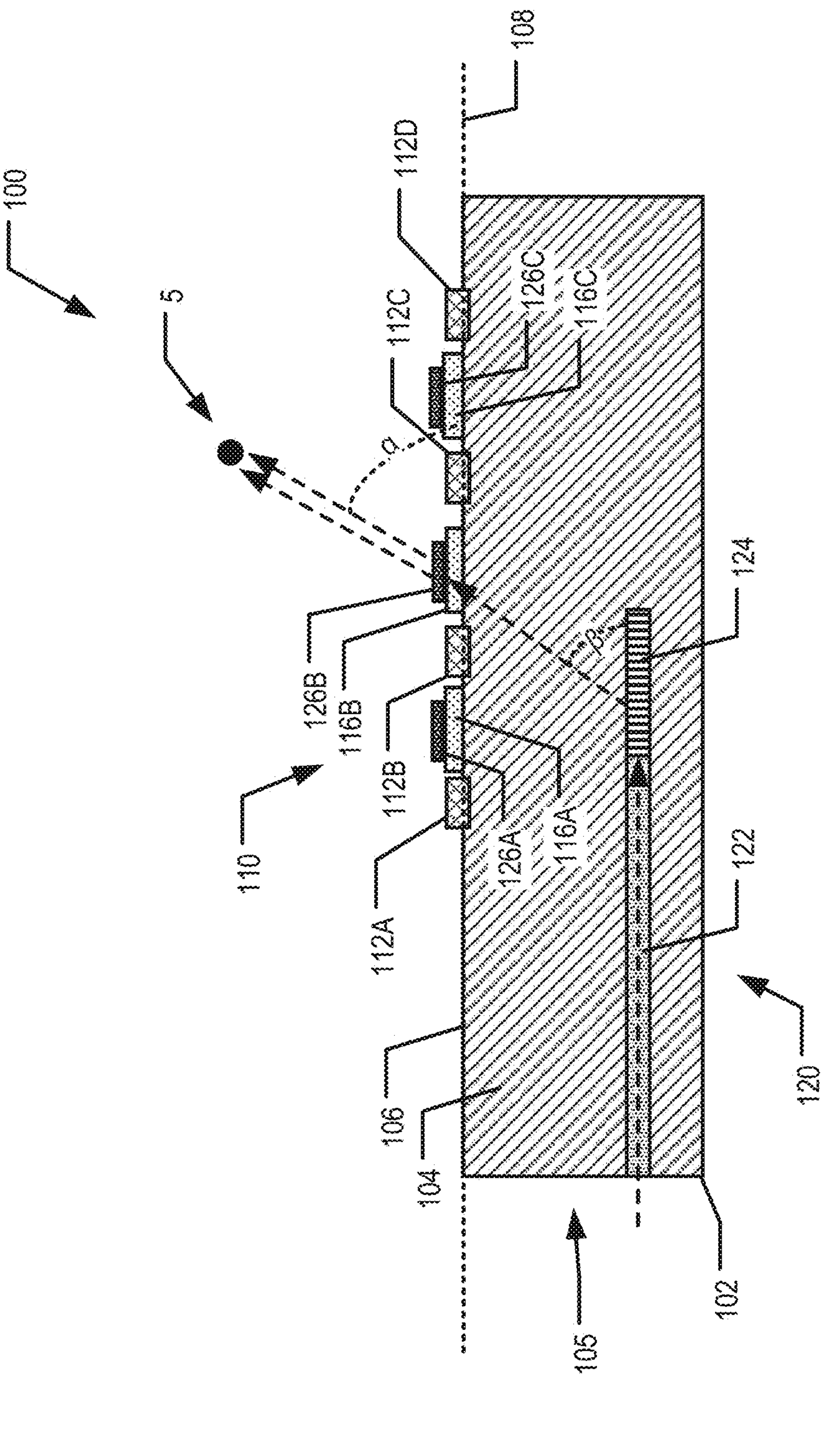
FIG. 1B is a schematic diagram illustrating a cross-sectional view of a portion of an example optics-integrated confinement apparatus, according to an example embodiment.

Various embodiments provide an optics-integrated confinement apparatus. FIGS. 1A, 1B, IC each provide a cross-sectional view of a portion of an example optics-integrated confinement apparatus 100. FIG. 2 provides a top view of a portion of an example optics-integrated confinement apparatus 100. In various embodiments, the optics-integrated confinement apparatus 100 comprises a confinement apparatus 110 and an on-chip beam delivery system 120. In various embodiments, the optics-integrated confinement apparatus 100 comprises a plurality of on-chip beam delivery systems 120 each configured to provide a respective optical beam to a respective target location. In various embodiments, the confinement apparatus 110 and the one or more on-chip beam delivery systems 120 are housed and/or hosted by a substrate 105. In an example embodiment, the substrate 105 is a Si substrate, though various other types of substrates may be used in various other embodiments.

In various embodiments, the confinement apparatus 110 a substrate 105 having a plurality of electrical components 112 (e.g., 112A, 112B, 112C, 112D) formed and/or disposed thereon. For example, in various embodiments, the plurality of electrical components 112 are disposed and/or formed on a surface 106 of the substrate 105. In various embodiments, the plurality of electrical components 112 includes radio frequency (RF) rails 114 (e.g., 114A, 114B), segmented control electrodes 118 (e.g., 118A, 118B), and/or other electrical components configured to and/or operable to generate the confining potential of the confinement apparatus 110. The confining potential is configured to confine one or more quantum objects within one or more confinement regions defined by the confinement apparatus 110. In various embodiments, the electrical components 112 and/or the confining potential are configured to at least partially define a plurality of target locations 5 within the confinement region(s).

In various embodiments, the target locations 5 are disposed in a one-dimensional or two-dimensional lay out. For example, in an example embodiment, the target locations are disposed along an axis of a linear configuration of electrical components 112 of the confinement apparatus 110. In another example embodiment, the target locations 5 are disposed in a two-dimensional array or layout defined by a two-dimensional configuration of electrical components 112 of the confinement apparatus 110. An example confinement apparatus 110 comprising a linear configuration of electrical components 112 (e.g., electrodes) is described by U.S. application Ser. No. 16/717,602, filed Dec. 17, 2019, though various other confinement apparatuses having linear electrical component configurations may be used in various embodiments. Some example confinement apparatuses 110 having two-dimensional electrical component 112 configurations are described by U.S. application Ser. No. 17/533,587, filed Nov. 23, 2021, and U.S. application Ser. No. 17/810,082, filed Jun. 30, 2022, though various other confinement apparatuses having two-dimensional electrical component configurations may be used in various embodiments. The contents of U.S. application Ser. No. 16/717,602, filed Dec. 17, 2019, U.S. application Ser. No. 17/533,587, filed Nov. 23, 2021, U.S. application Ser. No. 17/810,082, filed Jun. 30, 2022, are incorporated herein by reference in their entireties.

The optics-integrated confinement apparatus 100 further comprises one or more on-chip beam delivery systems 120. An on-chip beam delivery system 120 is configured to provide an optical beam to a respective target location 5. The optical beam provided to the respective target location 5 by the on-chip beam delivery system 120 has a desired polarization when the optical beam reaches the respective target location 5. In various embodiments, the on-chip beam delivery system 120 comprises a waveguide 122, a coupler 124, and an optical element 126B. While only waveguide 122 and one coupler 124 are illustrated in FIGS. 1A and 1B, in various embodiments, the optics-integrated confinement apparatus 100 may include a plurality of on-chip beam delivery systems 120 each including a respective waveguide 122 and corresponding coupler 124 and optical element 126. For example, the optics-integrated confinement apparatus 100 may include a plurality of waveguides, plurality of couplers 124, and a plurality of optical elements 126 (e.g., 126A, 126B, 126C, 126F, 126G, 126H).

In various embodiments, the waveguide 122 is configured to receive an optical beam at an input thereof and guide the optical beam along and/or through the waveguide. The waveguide may be a one-dimensional waveguide or a two-dimensional waveguide (e.g., a waveguide layer). In various embodiments, the waveguide 122 is a single mode waveguide. The waveguide 122 is embedded within the substrate 105. For example, the substrate 105 may include a wafer or chip base 102 on which various layers of optical components (e.g., waveguides, couplers, optical elements, etc.) and various layers of cladding 104 are formed. For example, the waveguide 122 is disposed between the wafer or chip base 102 and a top layer of cladding 104 that defines or forms the surface 106 of the substrate 105. In various embodiments, the optical confinement within the waveguide 122 is caused at least in part based on cladding disposed on one, two, three, or four surfaces of the waveguide 122.

In various embodiments, the coupler 124 is configured to couple at least a portion of the optical beam out of the waveguide 122 and direct the (at least a portion of the) optical beam toward the optical element 126. In various embodiments, the coupler 124 is embedded within the substrate 105. For example, the substrate 105 may include a wafer or chip base 102 on which various layers of optical components (e.g., waveguides, couplers, optical elements, etc.) and various layers of cladding 104 are formed. For example, the waveguide 122 is disposed between the wafer or chip base 102 and a top layer of cladding 104 that defines or forms the surface 106 of the substrate 105.

In various embodiments, the coupler 124 is a grating coupler. For example, in various embodiments, the coupler 124 comprises a sub-wavelength scale grating, a wavelength scale grating. In an example embodiment, the coupler 124 is a metasurface coupler. For example, in various embodiments, the coupler 124 comprises an array of sub-wavelength or wavelength columns or an array of other sub-wavelength or wavelength scale features. The wavelength scale corresponds to size scale that is comparable to a wavelength that characterizes the optical beam and the sub-wavelength scale corresponds to a size scale that is (substantially) smaller than a wavelength that characterizes the optical beam.

In various embodiments, the coupler 124 is configured to cause the optical beam to be coupled out of the waveguide 122 and directed toward the optical element 126 such that the optical beam forms a coupler-to-element angle $\beta$ with a surface of the coupler 124. In various embodiments, the coupler-to-element angle $\beta$ is greater than zero degrees and less than 180 degrees. In various embodiments, the coupler-to-element angle $\beta$ is greater than 30 degrees and less than 80 degrees. In an example embodiment, the coupler-to-element angle $\beta$ is in a range of 45 to 75 degrees. In various embodiments, the coupler-to-element angle $\beta$ is greater than 100 degrees and less than 150 degrees. In various embodiments, the coupler-to-element angle $\beta$ is in a range of 105 to 135 degrees.

In various embodiments, the optical element 126 is configured to direct the optical beam (or portion thereof) toward the target location 5. For example, the coupler 124 and the optical element 126 define a beam path from an outlet of the waveguide 122 to the target location 5. In an example embodiment, the beam path changes angle at the optical element 126. For example, a portion of the beam path between the optical element 126 and the target location 5 forms an altitude angle $\alpha$ with the surface 106 of the substrate 105. In various embodiments, the altitude angle $\alpha$ is not equal the coupler-to-element angle $\beta$. Thus, any portion of the optical beam that is coupled out of the waveguide 122 by the coupler 124 and that is not re-directed by the optical element 126 is not incident on the target location 5. For example, the optical element 126 is configured to condition the optical beam and direct the optical beam toward the target location 5. For example, the optical element 126 is configured to condition the optical beam by modifying the polarization of the optical beam and/or controlling various other optical properties of the optical beam (e.g., direction of propagation, wavelength, beam profile, phase, focusing, and/or the like). The altitude angle $\alpha$ and the coupler-to-element angle $\beta$ being different from one another prevents any portion of the optical beam that is not conditioned by the optical element 126 from being incident on the target location 5 and introducing noise into the interaction and/or function being performed at the target location 5 (via interaction of the optical beam with one or more quantum object and/or another optical beam).

In various embodiments, the altitude angle $\alpha$ is greater than zero degrees and less than 180 degrees. In various embodiments, the altitude angle $\alpha$ is greater than 30 degrees and less than 80 degrees. In an example embodiment, the altitude angle $\alpha$ is in a range of 45 to 75 degrees. In various embodiments, the altitude angle $\alpha$ is greater than 100 degrees and less than 150 degrees. In various embodiments, the altitude angle $\alpha$ is in a range of 105 to 135 degrees.

In various embodiments, the optical element 126 is configured to modify the polarization of an optical beam that is incident thereon. For example, the optical element 126 is a waveplate, in various embodiments. For example, the optical element 126 is configured to modify the polarization of the optical beam by introducing a phase delay based on the polarization of the optical beam when the optical beam is incident on the optical element, in an example embodiment. For example, in various embodiments, the polarization of the optical beam that is incident on the optical element 126 is different from the polarization of the optical beam directed toward the target location 5 by the optical element 126 as a result of the optical beam interacting with and/or being conditioned by the optical element 126.

In various embodiments, the optical element 126 changes a type of the polarization of the optical beam incident thereon. For example, the optical beam incident on the optical element 126 (e.g., the optical beam that was coupled out of the waveguide 122 by the coupler 124) has a linear polarization, in various embodiments. The optical element 126 modifies the polarization of the optical beam such that the optical beam directed to the target location 5 by the optical element 126 has elliptical or circular polarization. Thus, in various embodiments, linear polarized light may be guided to the optical element 126 (e.g., via the on-chip beam delivery system 120 and possibly a pre-chip beam delivery system). The optical element 126 may then convert the linear polarized optical beam to elliptical or circular polarized optical beam and direct the elliptical or circular polarized optical beam to the target location 5. The elliptical or circular polarized optical beam is then incident on the target location 5 to cause the desired interaction with one or more quantum objects disposed at the target location 5 and/or one or more other optical beams incident on the target location 5.

In another example, the optical beam incident on the optical element 126 may be TE polarized and the optical element 126 may be configured to modify the polarization of the optical beam such that the optical element 126 directs a TM polarized optical beam to the target location 5. In various embodiments, the optical element 126 may be configured to direct an optical beam having a desired polarization to the target location 5.

For example, FIG. 2 illustrates an example where a first optical beam 210 is directed to a target location 5 by a first optical element 126F and a second optical beam 220 is directed to the target location 5 by a second optical element 126H. The first optical beam 210 has a first polarization 212 and the second optical beam 220 has a second polarization 222. For the intended interaction at the target location 5 for this example, it is desired for the first polarization 212 and the second polarization 222 to be perpendicular to one another. Thus, the first optical element 126F is configured to cause the first optical beam 210 to have a first polarization 212, where the first polarization 212 may correspond to an arbitrary angle in the plane 108 defined by the confinement apparatus 110 (the xy-plane as illustrated in FIG. 2). The second optical element 126H is configured to cause the second optical beam 220 to have a second polarization 222 where the second polarization 222 may correspond to an arbitrary angle in the plane defined by the confinement apparatus 110 and having the desired relation to the first polarization 212.

As can be seen in FIG. 2, the polarization of the optical beam directed to the target location 5 may be an arbitrary polarization where the angle between the direction of propagation of the optical beam and the polarization vector of the optical beam is controlled by a corresponding optical element to provide the desired polarization for the intended interaction at the target location 5. Thus, the optical beam guided by the waveguide 122 may be provided to the waveguide 122 with a polarization that is efficiently guided along the waveguide 122 and then converted to a desired polarization close to the target location 5 such that power loss from the optical beam while being guided by the waveguide 122 may be minimized.

In various embodiments, the optical element 126 may be configured to control and/or condition one or more optical properties of the optical beam (e.g., instead of or in addition to polarization of the optical beam) that is directed to the target location. For example, the optical element 126 may be configured to control or condition the direction of propagation of the optical beam directed to the target location 5, the wavelength of the optical beam directed to the target location 5, a beam profile of the optical beam directed to the target location, a phase of the optical beam directed to the target location 5, focusing and/or a beam waist of the optical beam directed to the target location 5, and/or various other optical properties of the optical beam directed to the target location 5.

In various embodiments, the coupler 124 and the optical element 126 define a beam path from the waveguide 122 to the target location 5. The optical element 126 is configured to modify and/or change one or more optical properties of an optical beam as the optical beam traverses the beam path from the waveguide 122 to the target location. For example, in various embodiments, the optical element 126 is configured to modify and/or change the polarization and the direction of propagation of the optical beam as the optical beam traverses the beam path from the waveguide 122 to the target location 5. In various embodiments, the optical element 126 may be configured to modify, change, control, and/or condition various optical properties (e.g., polarization, direction of propagation wavelength, beam profile, phase, focusing, beam waist width and/or location, and/or various other optical properties) of the optical beam traversing the beam path from the waveguide 122 to the target location 5. For example, the optical element 126 is configured to control one or more optical properties of the optical beam to cause a desired illumination pattern at the target location 5.

In various embodiments, the optical element 126 is a metasurface. For example, the optical element 126 may be a transparent optical component comprising a sub-wavelength scale grating, a wavelength scale grating, or a plurality of sub-wavelength or wavelength scale features. For example, the optical element 126 may comprise an array of columns or pillars that have diameters, heights, and/or other dimensions that are sub-wavelength scale or wavelength scale. In various embodiments, the metasurface (e.g., the features of the metasurface) are made of a metasurface material comprising one or more of $TiO_2$ Si, $HfO_2$, $Ta_2O_5$, SiN, indium tin oxide (ITO), hydrogen doped InO (H:InO), and/or another appropriate material.

In the example embodiment illustrated in FIG. 1A, the optical element 126 is a metasurface comprising dielectric material. The dielectric optical elements 126 are embedded in the cladding 104 of the substrate 105. The cladding 104 acts to shield the quantum objects from any charge build up on the optical element 126 and to reduce the capacitance of the optics-integrated confinement apparatus 100. In an example embodiment, the optical element 126 illustrated in FIG. 1A is a conductive plasmonic metasurface. For example, the optical element 126 is a thin surface incorporating a plurality of metallic and/or conductive nanostructures of wavelength or subwavelength dimensions, in an example embodiment.

In the example embodiment illustrated in FIG. 1B, the optical element 126 is metasurface comprising a conductive material. The conductive optical elements 126 are formed on and/or in transparent conductive windows 116 (e.g., 116A, 116B, 116C, 116D, 116E, 116F, 116G, 116H, 116I). For example, the optical elements 126 are formed on the surface 106. In various embodiments, the optical elements 126 are grounded and/or are in electrical communication with a constant voltage source so as to prevent undesired charge build up on the optical elements 126.

As shown in FIG. 2, an optics-integrated confinement apparatus 100 may include both embedded optical elements (e.g., the optical elements corresponding to transparent conductive windows 116D, 116E, and 116I which are not visible because they are embedded below the surface 106 of the substrate 105) and surface optical elements (e.g., 126F, 126G, 126H) which are formed on and/or in respective transparent conductive windows 116F, 116G, 116H.

In various embodiments, the beam path of an on-chip beam delivery system 120 defined by the coupler 124 and the optical element 126 from the waveguide 122 to the target location 5 passes through a respective transparent conductive window 116. In various embodiments, a transparent conductive window 116 comprises ITO. Various other transparent conductive materials may be used in various embodiments. The transparent conductive window 116 is configured to reduce interaction between the electrical components 112 and the optical beam. For example, the transparent conductive window 116 allows the optical beam to pass therethrough while shielding the quantum objects confined by the confinement apparatus 110 from electronic charge that may be trapped in various layers of the on-chip beam delivery systems 120.

In an example embodiment, an optical element 126 may be an active optical component. For example, the control and/or conditioning of optical properties of the optical beam by the optical element 126 is dynamically controllable, in an example embodiment. For example, the phase delay introduced to the optical beam by the optical element 126 is controllable in an example embodiment. For example, the index of refraction of the metasurface and/or a material included in the features of the metasurface may be controllable using a voltage signal, for example, such that the phase delay introduced into the optical beam by the optical element 126 may be modified during operation of the optics-integrated confinement apparatus 100. For example, a feedback loop may be used to control one or more characteristics of the optical element 126 to cause and/or ensure the optical element 126 to control and/or condition the optical properties of the optical beam as desired. For example, the active optical element 126 of an example embodiment has a dynamically controllable birefringence (e.g., the polarization-dependent phase shift imposed by the optical element 126). In another example embodiment, the active optical element 126 of an example embodiment has a dynamically controllable optical axis.

Figure 1C:
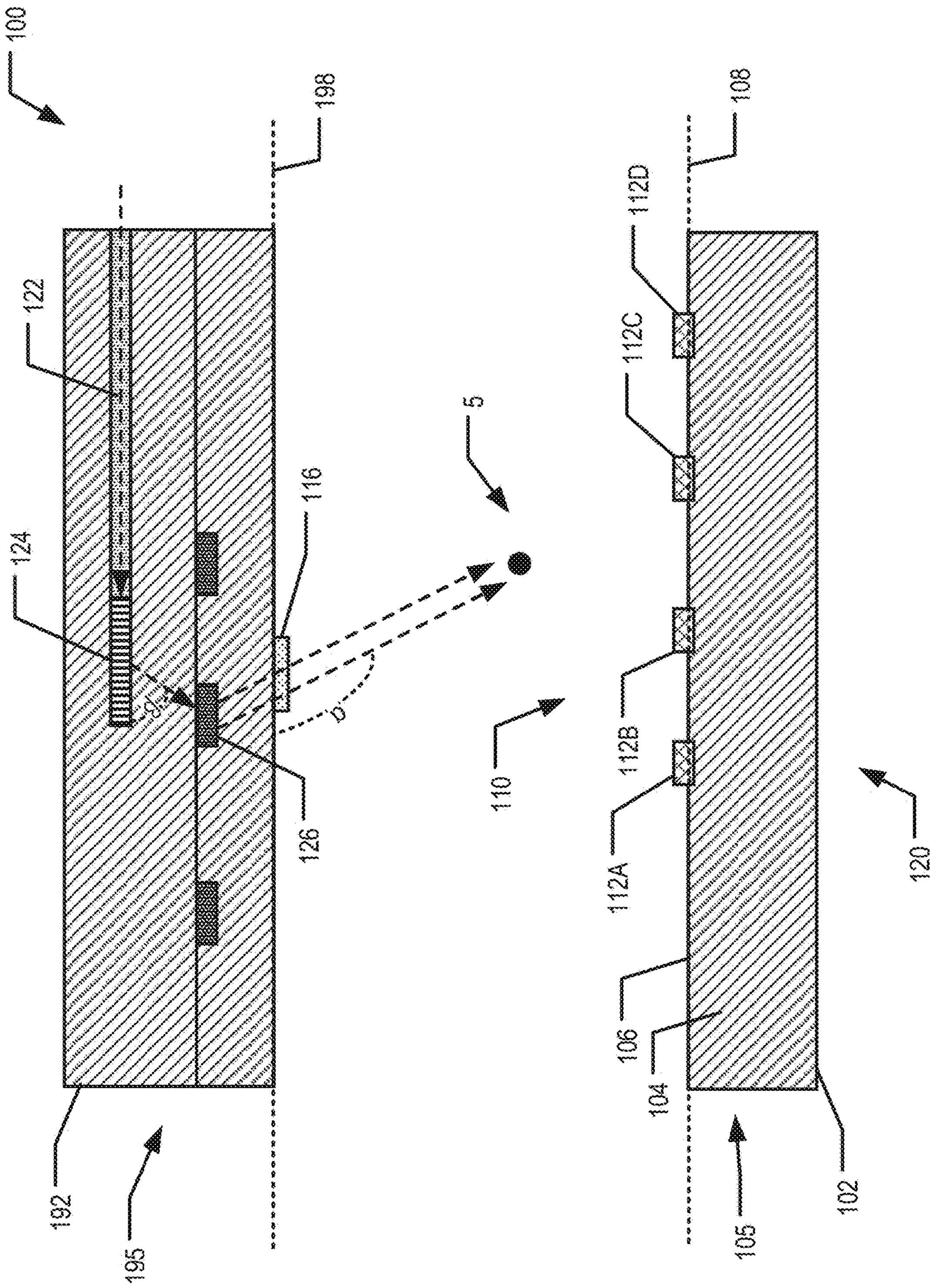
FIG. 1C is a schematic diagram illustrating a cross-sectional view of a portion of an example optics-integrated confinement apparatus, according to an example embodiment.

FIG. 1C illustrates another example of an optics-integrated confinement apparatus 100 where at least a portion of the on-chip beam delivery system 120 is hosted by a photonics platform substrate 192 (e.g., a second substrate) that is mounted and/or secured with respect to the substrate 105 (e.g., a first substrate) hosting the confinement apparatus 110 (and possibly a portion of the on-chip beam delivery system 120). In an example embodiment, the photonics platform 195 is mounted and/or secured with respect to the substrate 105 hosting the confinement apparatus 110 (and possibly a portion of the on-chip beam delivery system 120) such that the plane 108 defined by the confinement apparatus 110 is parallel to the photonic platform surface plane 198 defined by a surface of the photonic platform substrate 192 that faces the confinement apparatus 110.

For example, the optics-integrated confinement apparatus 100 may include a photonics platform 195 that comprises a photonic platform substrate 192, one or more waveguides 122, one or more couplers 124, one or more optical elements 126, one or more transparent conductive windows, and/or other components of the on-chip beam delivery system 120.

Thus, in various embodiments, the on-chip beam delivery system 120 is disposed on a common substrate with the confinement apparatus 110. In various embodiments, the confinement apparatus 110 is disposed on a first substrate and the on-chip beam delivery system 120 is disposed on a second substrate that is mounted and/or secured with respect to the first substate. In various embodiments, a first portion of the on-chip beam delivery system 120 is disposed the first substrate with the confinement apparatus 110 and a second portion of the on-chip beam delivery system 120 is disposed on the second substrate that is mounted and/or secured with respect to the first substrate.

Example Quantum Computing System Comprising an Optics-integrated Confinement Apparatus In various embodiments, an optics-integrated confinement apparatus 100 is part of a system. An example of such a system is a QCCD-based quantum computing system 300, as illustrated by FIG. 3.

FIG. 3 provides a schematic diagram of an example quantum computing system 300 comprising an optics-integrated confinement apparatus 100, in accordance with an example embodiment. In various embodiments, the optics-integrated confinement apparatus 100 comprises a confinement apparatus 110 and one or more on-chip beam delivery systems 120 hosted by a substrate 105.

In various embodiments, the quantum computing system 300 comprises a computing entity 10 and a quantum computer 310. In various embodiments, the quantum computer 310 comprises a controller 30 and a quantum processor 315. In various embodiments, the quantum processor comprises a cryogenic and/or vacuum chamber 40, an optics-integrated confinement apparatus 100 disposed within the cryogenic and/or vacuum chamber 40, one or more optical elements and/or manipulation sources 60, and one or more voltage sources 50 configured to provide voltage signals to the electrical components 112 of the confinement apparatus 110. In various embodiments the quantum processor 115 further includes one or more photodetectors configured for detecting optical signals generated by quantum objects confined at respective object locations, magnetic field generators configured to for generating a desired magnetic field and/or magnetic field gradient at respective object locations, calibration and/or feedback loop sensors 70, and/or the like.

In various embodiments, the cryogenic and/or vacuum chamber 40 is a temperature and/or pressure-controlled chamber. For example, the quantum computing system 300 may comprise vacuum and/or temperature control components that are operatively coupled to the cryogenic and/or vacuum chamber 40.

In various embodiments, the quantum computer 310 comprises one or more voltage sources 50. For example, the voltage sources 50 may comprise a plurality of voltage drivers and/or voltage sources and/or at least one radio frequency (RF) driver and/or voltage source. The voltage sources 50 may be electrically coupled to the corresponding electrical components 112 (e.g., electrodes) of the confinement apparatus 110, in an example embodiment. For example, the electric and/or electromagnetic field formed at least in part by applying the voltage signals generated by the voltage source 50 to the electrical components 112 of the confinement apparatus 110 causes and/or forms the confinement region(s) of the confinement apparatus.

In various embodiments, a computing entity 10 is configured to allow a user to provide input to the quantum computer 310 (e.g., via a user interface of the computing entity 10) and receive, view, and/or the like output from the quantum computer 310. The computing entity 10 may be in communication with the controller 30 of the quantum computer 310 via one or more wired or wireless networks 20 and/or via direct wired and/or wireless communications. In an example embodiment, the computing entity 10 may translate, configure, format, and/or the like information/data, quantum computing algorithms and/or circuits, and/or the like into a computing language, executable instructions, command sets, and/or the like that the controller 30 can understand and/or implement.

In various embodiments, the controller 30 is configured to control and/or be in electrical communication with the voltage sources 50, cryogenic system and/or vacuum system controlling the temperature and/or pressure within the cryogenic and/or vacuum chamber 40, manipulation sources 60, photodetectors, calibration and/or feedback loop sensors 70, and/or other systems controlling various environmental conditions (e.g., temperature, pressure, magnetic field, and/or the like) within the cryogenic and/or vacuum chamber 40 and/or configured to manipulate and/or cause a controlled evolution of quantum states of one or more quantum objects confined by the confinement apparatus 110. For example, the controller 30 may cause a controlled evolution of quantum states of one or more quantum objects within the confinement apparatus to execute a quantum circuit and/or algorithm. For example, the controller 30 may cause a reading procedure to be performed, possibly as part of executing a quantum circuit and/or algorithm. In various embodiments, the quantum objects confined within the confinement apparatus are used as qubits of the quantum processor 315 and/or quantum computer 310.

In various embodiments the quantum computer 310 comprises a feedback loop 320. For example, calibration and/or feedback loop sensors 70 may be configured to capture measurements of various aspects of the operation of the quantum computer 310 and provide signals representing those measurements to the controller 30. The controller 30 may then modify the operation of one or more manipulation sources 60, voltage sources 50, active optical elements 126 of one or more on-chip beam delivery systems 120, and/or the like based on processing one or more signals representing respective measurements captured by respective calibration and/or feedback loop sensor 70. For example, in an example embodiment, a calibration and/or feedback loop sensor 70 detects and/or measures the polarization of an optical beam directed toward a target location by a respective optical element 126. The controller 30 process a signal received from the calibration and/or feedback loop sensor 70 to determine whether the detected and/or measured polarization of the optical beam matches and/or is substantially the same as a desired polarization for the optical beam. In an instance where the detected and/or measured polarization of the optical beam does not match and/or is not substantially the same as the desired polarization for the optical beam and the respective optical element 126 is an active optical element, the controller 30 may modify one or more dynamically configurable parameters of the optical element 126 (e.g. modify operation of the optical element 126) such that the polarization of the optical beam directed to the target location 5 by the optical element 126 is closer to, matches, and/or substantially the same as the desired polarization.

Technical Advantages

Waveguides, such as single-mode waveguides, are capable of carrying optical beams having transverse electric (TE) or transverse magnetic (TM) polarization. However, a desired optical beam polarization may be polarization other than TE or TM polarization. For example, the desired polarization of an optical beam may be elliptical or circular polarization. In another example, the desired polarization of an optical beam may include an arbitrary angle between the direction of propagation of the optical beam and the polarization direction of the optical beam. Delivery of optical beams with elliptical or circular polarization or with an arbitrary angle between the direction of propagation of the optical beam and the polarization direction of the optical beam is technically difficult. Therefore, technical problems exist regarding how to provide optical beams to target locations of a confinement apparatus.

Various embodiments provide technical solutions to these technical problems. For example, various embodiments provide an optics-integrated confinement apparatus comprising a waveguide, a coupler, and an optical element. The waveguide may be provided with an optical beam having TE, TM, or other polarization able to efficiently propagate along the waveguide. The coupler couples the optical beam (or at least a portion thereof) out of the waveguide and toward the optical element. The optical beam coupled out of the waveguide by the coupler is incident on the optical element. The optical element modifies the polarization, and possibly one or more other optical properties of the optical beam, and directs the optical beam toward the target location. Thus, any pre-chip beam delivery system and the on-chip delivery system is able to convey an optical beam having an efficiently conveyed polarization to near the target location. The optical element then modifies the polarization of the optical beam from the efficiently conveyed polarization to the desired polarization for the interaction at the target location. Thus, various embodiments provide improved beam delivery systems, optics-integrated confinement apparatuses, and system including optics-integrated confinement apparatuses.

Example Controller

In various embodiments, an optics-integrated confinement apparatus 100 is incorporated into a system (e.g., a quantum computing system 300) comprising a controller 30. In various embodiments, the controller 30 is configured to control various elements of the system (e.g., quantum computer 310). For example, the controller 30 may be configured to control the voltage sources 50, a cryogenic system and/or vacuum system controlling the temperature and pressure within the cryogenic and/or vacuum chamber 40, manipulation sources 60, cooling system, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more quantum objects confined by the confinement apparatus 110 of the optics-integrated confinement apparatus 100. In various embodiments, the controller 30 may be configured to receive signals from one or more photodetectors, calibration and/or feedback loop sensors 70, and/or the like.

As shown in FIG. 4, in various embodiments, the controller 30 may comprise various controller elements including processing elements 405, memory 410, driver controller elements 415, a communication interface 420, analog-digital (A/D) converter elements 425, and/or the like. For example, the processing elements 405 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 405 of the controller 30 comprises a clock and/or is in communication with a clock.

For example, the memory 410 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 410 may store a queue of commands to be executed to cause a quantum algorithm and/or circuit to be executed (e.g., an executable queue), qubit records corresponding the qubits of quantum computer (e.g., in a qubit record data store, qubit record database, qubit record table, and/or the like), a calibration table, computer program code (e.g., in a one or more computer languages, specialized controller language(s), and/or the like), and/or the like. In an example embodiment, execution of at least a portion of the computer program code stored in the memory 410 (e.g., by a processing element 405) causes the controller 30 to perform one or more steps, operations, processes, procedures and/or the like described herein for providing manipulation signals to atomic object positions and/or collecting, detecting, capturing, and/or measuring indications of emitted signals emitted by quantum objects located at corresponding target locations 5 of the optics-integrated confinement apparatus 100. In various embodiments, the computer program code stored in the memory 410 comprise quantum assembly (QASM) and/or quantum intermediate representation (QIR) code and/or machine code generated by compiling QASM and/QIR code.

In various embodiments, the driver controller elements 415 may include one or more drivers and/or controller elements each configured to control one or more drivers. In various embodiments, the driver controller elements 415 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 405). In various embodiments, the driver controller elements 415 may enable the controller 30 to operate a voltage sources 50, manipulation sources 60, cooling system, and/or the like. In various embodiments, the drivers may be laser drivers configured to operate one or manipulation sources 60 to generate manipulation signals; vacuum component drivers; drivers for controlling the flow of current and/or voltage applied to electrical components 112 used for maintaining and/or controlling the trapping potential of the confinement apparatus; cryogenic and/or vacuum system component drivers; cooling system drivers, and/or the like. In various embodiments, the controller 30 comprises means for communicating and/or receiving signals from one or more optical receiver components (e.g., photodetectors calibration and/or feedback loop sensors 70). For example, the controller 30 may comprise one or more analog-digital converter elements 425 configured to receive signals from one or more optical receiver components (e.g., a photodetector of the optics collection system), calibration and/or feedback loop sensors 70, and/or the like.

In various embodiments, the controller 30 may comprise a communication interface 420 for interfacing and/or communicating with a computing entity 10. For example, the controller 30 may comprise a communication interface 420 for receiving executable instructions, command sets, and/or the like from the computing entity 10 and providing output received from the quantum computer 310 (e.g., from an optical collection system) and/or the result of a processing the output to the computing entity 10. In various embodiments, the computing entity 10 and the controller 30 may communicate via a direct wired and/or wireless connection and/or via one or more wired and/or wireless networks 20.

Example Computing Entity

FIG. 5 provides an illustrative schematic representative of an example computing entity 10 that can be used in conjunction with embodiments of the present invention. In various embodiments, a computing entity 10 is configured to allow a user to provide input to the quantum computer 310 (e.g., via a user interface of the computing entity 10) and receive, display, analyze, and/or the like output from the quantum computer 310.

As shown in FIG. 5, a computing entity 10 can include an antenna 512, a transmitter 504 (e.g., radio), a receiver 506 (e.g., radio), and a processing element 508 that provides signals to and receives signals from the transmitter 504 and receiver 506, respectively. The signals provided to and received from the transmitter 504 and the receiver 506, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

In various embodiments, the computing entity 10 may comprise a network interface 520 for interfacing and/or communicating with the controller 30, for example. For example, the computing entity 10 may comprise a network interface 520 for providing executable instructions, command sets, and/or the like for receipt by the controller 30 and/or receiving output and/or the result of a processing the output provided by the quantum computer 310. In various embodiments, the computing entity 10 and the controller 30 may communicate via a direct wired and/or wireless connection and/or via one or more wired and/or wireless networks 20.

The computing entity 10 may also comprise a user interface device comprising one or more user input/output interfaces (e.g., a display 516 and/or speaker/speaker driver coupled to a processing element 508 and a touch screen, keyboard, mouse, and/or microphone coupled to a processing element 508). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 518 (hard or soft), a touch display, voice/speech or motion interfaces, scanners, readers, or other input device. In embodiments including a keypad 518, the keypad 518 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 522 and/or non-volatile storage or memory 524, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An optics-integrated confinement apparatus comprising: a first substrate;

a plurality of electrical components formed on the first substrate, wherein the plurality of electrical components define a confinement apparatus operable to confine one or more quantum objects;

and an on-chip beam delivery system, the on-chip beam delivery system comprising a waveguide, a coupler, and an optical element, wherein:

the coupler is configured to couple an optical beam out of the waveguide and toward the optical element, and the optical element is configured to at least one of (a) modify a polarization of the optical beam or (b) direct the optical beam toward a target location defined by the optics-integrated confinement apparatus.

2. The optics-integrated confinement apparatus of claim 1, wherein the waveguide and the coupler are embedded within one of the first substrate or a second substrate that is secured with respect to the first substrate.

3. The optics-integrated confinement apparatus of claim 2, wherein the coupler and the optical element define a beam path from the waveguide to the target location.

4. The optics-integrated confinement apparatus of claim 3, wherein the beam path passes through a transparent conductive window disposed on a surface of the one of the first substrate or the second substrate.

5. The optics-integrated confinement apparatus of claim 4, wherein the optical element is formed on or in the transparent conductive window.

6. The optics-integrated confinement apparatus of claim 4, wherein a portion of the beam path between the transparent conductive window and the target location forms an altitude angle with the surface of the one of the first substrate or the second substrate that is in a range of 0 to 180 degrees.

7. The optics-integrated confinement apparatus of claim 6, wherein the altitude angle is in a range of 30 to 80 degrees.

8. The optics-integrated confinement apparatus of claim 3, wherein a portion of the beam path between the coupler and the optical element defines a coupler-to-element angle and the coupler-to-element angle is in a range of 30 to 80 degrees.

9. The optics-integrated confinement apparatus of claim 2, wherein the optical element is embedded within the one of the first substrate or the second substrate.

10. The optics-integrated confinement apparatus of claim 1, wherein at least one of: the optical element is a wave plate, the optical element is configured to modify the polarization of the optical beam by converting the polarization of the optical beam from linear polarization to elliptical or circular polarization, or the optical element is configured to modify the polarization of the optical beam by rotating the polarization of the optical beam to a desired interaction angle.

11. The optics-integrated confinement apparatus of claim 1, wherein the optical element is at least one of (a) a transparent metasurface or (b) a grating coupler.

12. The optics-integrated confinement apparatus of claim 1, wherein the coupler comprises at least one of a sub-wavelength scale grating, a wavelength scale grating, or an array of sub-wavelength scale or wavelength scale features.

13. The optics-integrated confinement apparatus of claim 1, wherein the optical element is configured to at least one of (a) control one or more optical properties of the optical beam to cause a desired illumination pattern at the target location or (b) modify an optical axis of the optical beam exiting the optical element.

14. The optics-integrated confinement apparatus of claim 1, wherein the optical element comprises sub-wavelength or wavelength scale features.

15. The optics-integrated confinement apparatus of claim 1, wherein the optical element is configured to modify the polarization of the optical beam by introducing a phase delay based on the polarization of the optical beam when the optical beam is incident on the optical element.

16. The optics-integrated confinement apparatus of claim 15, wherein the optical element is an active optical element such that the phase delay introduced to the optical beam by the optical element is controllable.

17. The optics-integrated confinement apparatus of claim 1, wherein the optical beam is provided to the target location such that the optical beam is incident on at least one quantum object of the one or more quantum objects, the at least one quantum object being located at the target location, to cause a controlled evolution of a quantum state of the at least one quantum object.

18. The optics-integrated confinement apparatus of claim 1, further comprising a plurality of waveguides, a plurality of couplers, and a plurality of optical elements each configured to define a respective beam path to a respective target location defined by the optics-integrated confinement apparatus.

19. A system comprising:

an optics-integrated confinement apparatus comprising: a first substrate;

a plurality of electrical components formed on the first substrate, wherein the plurality of electrical components define a confinement apparatus operable to confine one or more quantum objects;

and an on-chip beam delivery system, the on-chip beam delivery system comprising a waveguide, a coupler, and an optical element, wherein:

the coupler is configured to couple an optical beam out of the waveguide and toward the optical element, and the optical element is configured to at least one of (a) modify a polarization of the optical beam or (b) direct the optical beam toward a target location defined by the optics-integrated confinement apparatus; and a controller configured to control one or more voltage sources configured to provide voltage signals to respective electrical components of the plurality of electrical components to cause the confinement apparatus to generate a confining potential configured to confine the one or more quantum objects.

20. The system of claim 19, further comprising:

a manipulation source and a pre-chip beam delivery system, wherein the manipulation source is configured to generate the optical beam and the pre-chip beam delivery system is configured to provide the optical beam to the waveguide, and wherein the controller is configured to control operation of the manipulation source.

21. The system of claim 19, wherein the optical element is an active optical element and the controller is configured to control operation of the active optical element.

22. The system of claim 21, further comprising a feedback circuit and the controller is configured to control operation of the active optical element via the feedback circuit.

23. The system of claim 20, wherein the system is a quantum charge-coupled device (QCCD)-based quantum computer.

* * * * *